July 19, 1949.  C. W. HANSELL  2,476,862
APPARATUS FOR HANDLING TELEGRAPH
MESSAGES WITH A PLASTIC TAPE
Filed Aug. 10, 1946
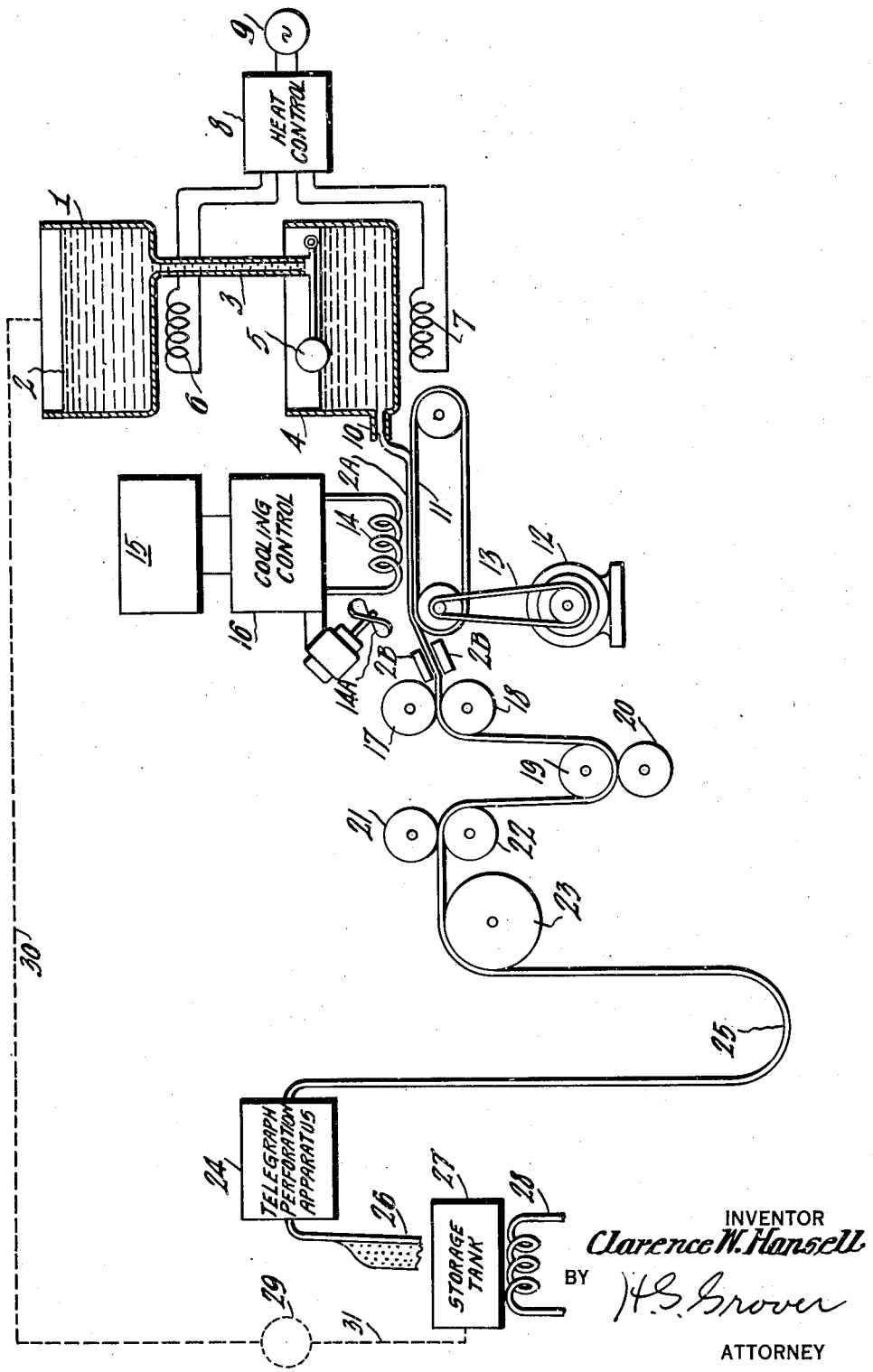
INVENTOR
*Clarence W. Hansell*
BY
*H. S. Grover*
ATTORNEY Patented July 19, 1949

2,476,862

UNITED STATES PATENT OFFICE 2,476,862

APPARATUS FOR HANDLING TELEGRAPH MESSAGES WITH A PLASTIC TAPE

Clarence W. Hansell, Port Jefferson, N. Y., assignor to Radio Corporation of America, a corporation of Delaware Application August 10, 1946, Serial No. 689,653

3 Claims. (Cl. 178—3)

This invention relates to new and useful apparatus for making and using a thermoplastic tape for handling telegraph messages, such as, for example, sending, receiving, and recording or relaying of messages by means of perforated tape. For some description of a part of the prior art, reference may be made to a book entitled "Submarine Telegraphy," by Duncan H. Cameron, published by International Textbook Co., Scranton, Pa. See also a book "Submarine Telegraphy," Part II, Instruction Paper prepared by the Engineers of the Western Union Telegraph Co., American School, Chicago.

An object of this invention is to reduce cost and to permit continuous operation of telegraph tape perforating; also, to reduce the wear and tear on the punches used in the telegraph perforators.

Prior to my invention, paper tapes were used which required the storage of a large number of rolls. Also, the telegraph apparatus had to be shut down when a new roll was placed in an operating position. The paper tape of the prior art was discarded after it had served its useful purpose of communicating the message. My invention overcomes the disadvantage of the prior art by providing a continuous operation from a vessel containing a thermoplastic which is maintained in a liquid state. The liquid plastic is conveyed through a long cooled guide or slot having approximately the same cross section as the desired finished tape. Here it is solidified in the proper thickness and width, and then passed into the telegraph perforating apparatus where it is perforated in accordance with the telegraph messages, in the manner commonly employed in automatic telegraph transmission. The tape is then fed through an automatic transmitting machine which is actuated by perforations in the tape to send the message. After use, the tape is returned to a storage tank for remelting and for the making of new tape from the material. The tape may be returned manually (or preferably, automatically) to the melting tank or vessel containing the plastic. Thus the plastic material for the tape is used over and over again.

This invention will be more completely understood by referring to the accompanying drawing, in which a vessel 1 contains a thermoplastic 2 which is maintained in a liquid state. A pipe 3 runs from the lower portion of vessel 1 to a second vessel or tank 4. A float control valve 5 is provided for maintaining a constant level of the molten plastic material in the second vessel 4. The thermoplastic 2 is preferably polyethylene, which melts at a temperature of approximately 350° F., the heating temperature being provided by means of electric heaters 6 and 7. The temperature of the electric heaters is maintained by a heat control device 8 which is electrically connected to an electrical supply source 9. The liquid material from vessel 4 runs through a gate or suitable valve mechanism 10 and then drops upon a conveyer belt 11 which is operated by an electric motor 12 which is connected to one of the rollers by means of a belt 13. Located at the surface of the conveyer belt 11 is a cooling coil 14 through which passes a suitable refrigerant from a source 15. A cooling control device 16 is interposed between coil 14 and source 15. If additional cooling is required, a fan 14A may be provided for air cooling the tape. After the tape passes over the conveyer belt, it is formed in a semi-plastic tape 2A. The tape 2A passes through a long cooled guide or slot 2B having the same cross section as the desired finished tape. It then passes around or between rollers 17, 18, 19, 20, 21 and 22 which may stretch and further reduce the thickness of the tape to the desired dimension, which is preferably in the order of 1 mil thick. The tape 2A then passes over a guide wheel 23 which is driven by any suitable means (not shown), the speed of which is adjusted to operate with the telegraph perforating apparatus 24. In order to take care of any lag or lead in the speeds of members 23 and 24, a loop 25 is provided. After the tape passes through the telegraph perforating apparatus as indicated at 26, and its intelligence utilized, it is then placed in a storage tank 27 which is electrically heated by means of an electric heater 28. Here it is remelted and used over again. Where it is desired to save the used tapes, a pump 29 is provided to automatically return the plastic liquid from the storage tank 27 back into the vessel 1. The pump 29 is interposed between storage tank 27 and vessel 1, and connected by means of pipe lines 30 and 31 as shown by the broken lines. If preferred, the tape may be delivered, by suitable pullers, directly back to tank 1 for remelting.

Although this invention is disclosed as being used for telegraph perforating apparatus, it can be advantageously applied in facsimile recording systems where the record is to be available for use for only a short time, such as in train announcing systems and so forth. With such an arrangement, wide tapes or strips of thermoplastic material are to be employed.

What is claimed is:

1. Apparatus for producing a plastic tape comprising a first vessel containing a fluid plastic, a second vessel in fluid communication with said first vessel, means for regulating the temperature of said first and second vessels, a gate on said second vessel to permit a regulated flow from said fluid plastic, a movable belt to receive and convey said plastic, means located above said belt for forming and chilling the fluid plastic into a semi-plastic state, means for passing said tape through telegraph perforating apparatus to be perforated with telegraph intelligence, means for utilizing the intelligence on said tape, and means to then return said perforated tape to a liquid state after its intelligence has been utilized.

2. Apparatus for producing a plastic tape comprising a first vessel containing a fluid plastic, a second vessel in fluid communication with said first vessel, means for regulating the temperature of said first and second vessel, a gate on said second vessel to permit a regulated flow from said fluid plastic, a movable belt to receive and convey said plastic, means located above said belt for forming and chilling the fluid plastic into a semi-plastic state, a plurality of rollers for passing said tape therethrough to obtain the desired thickness of said tape, means for passing said tape through telegraph perforating apparatus to be perforated with telegraph intelligence, means to utilize said tape for communication purposes after it has passed through said telegraph perforating apparatus, and means to then return said tape to a liquid state after its intelligence has been utilized.

3. Apparatus for producing a plastic tape comprising a first vessel containing a fluid plastic, a second vessel in fluid communication with said first vessel, means to control the fluid plastic level in said second vessel, means for regulating the temperature of said first and second vessels, a gate on said second vessel to permit a regulated flow from said fluid plastic, a movable belt to receive and convey said plastic, means located above said belt for forming and chilling the fluid plastic into a semi-plastic state, a plurality of rollers for passing said tape therethrough to obtain the desired thickness of said tape, means for passing said tape through telegraph perforating apparatus to be perforated with telegraph intelligence, means to utilize said tape for communication purposes after it passes through said telegraph perforating apparatus, and means to return said tape to a liquid state, and means to return it to said first vessel after its intelligence has been utilized.

CLARENCE W. HANSELL.

REFERENCES CITED

The following references are of record in the file of this patent:

UNITED STATES PATENTS

| Number | Name | Date |
| --- | --- | --- |
| 1,956,564 | Crane | May 1, 1934 |
| 2,167,734 | Zonino | Aug. 1, 1939 |
| 2,221,019 | Clarke | Nov. 12, 1940 |
| 2,266,027 | Gubisch | Dec. 16, 1941 |
| 2,350,382 | Angel | June 6, 1944 |